US012564532B2

(12) United States Patent
Sawyers et al.

(10) Patent No.: US 12,564,532 B2
(45) Date of Patent: Mar. 3, 2026

(54) ADJUSTABLE, MULTI-FUNCTIONAL SHOULDER STRETCHING DEVICE

(71) Applicant: MEDI-DYNE HEALTHCARE PRODUCTS, LTD., Colleyville, TX (US)

(72) Inventors: Andrew Sawyers, Colleyville, TX (US); Craig Digiovanni, Colleyville, TX (US); Blair Patton, Colleyville, TX (US)

(73) Assignee: MEDI-DYNE HEALTHCARE PRODUCTS, LTD., Colleyville, TX (US)

( * ) Notice: Subject to any disclaimer, the term of this patent is extended or adjusted under 35 U.S.C. 154(b) by 0 days.

(21) Appl. No.: 18/024,006

(22) PCT Filed: Feb. 23, 2023

(86) PCT No.: PCT/US2023/063096
§ 371 (c)(1),
(2) Date: Feb. 28, 2023

(87) PCT Pub. No.: WO2023/168179
PCT Pub. Date: Sep. 7, 2023

(65) Prior Publication Data

US 2024/0277549 A1 Aug. 22, 2024

Related U.S. Application Data

(60) Provisional application No. 63/268,706, filed on Mar. 1, 2022.

(51) Int. Cl.
*A61H 1/02* (2006.01)

(52) U.S. Cl.
CPC ... *A61H 1/0281* (2013.01); *A61H 2201/0192* (2013.01); *A61H 2201/1635* (2013.01)

(58) Field of Classification Search
CPC .................................................. A63B 2225/09
See application file for complete search history.

(56) References Cited

U.S. PATENT DOCUMENTS 2,618,496 A * 11/1952 Johnson .................... E04G 5/02
182/201
2,836,188 A * 5/1958 Jordan ..................... A61H 3/02
294/104

(Continued)

OTHER PUBLICATIONS

Jeff Kuhland, Product Review: The Rotater for Shoulder Rehab and Prehab, Review Article, Apr. 23, 2013, US.

(Continued)

*Primary Examiner* — Garrett K Atkinson
(74) *Attorney, Agent, or Firm* — Sheri Higgins Law, PLLC; Sheri Higgins

(57) ABSTRACT

A shoulder stretching device can be used to stretch or strengthen targets muscles before or after surgery, after an injury, or for workouts. The device is multi-functional and adjustable. The device can include a longitudinal member, a top transverse member and forearm member operatively connected to the longitudinal member, a curved elbow member, and a bottom transverse member indirectly connected to the longitudinal member via the curved elbow member. The members can be perpendicular to the longitudinal member. The top transverse and forearm members can be adjusted along a length and can rotate about the longitudinal member. Handgrips can be located at ends of the top and bottom transverse members. A user can adjust the location and angles of the members in relation to each other and placement of the handgrips for adjustability and to use the device in a multi-functional way.

20 Claims, 12 Drawing Sheets

(56) References Cited

U.S. PATENT DOCUMENTS 3,638,939 A * 2/1972 Langley ............... A61H 1/0244 15/230.11
3,759,250 A * 9/1973 Salata .................... A61H 15/00 601/133
4,121,577 A * 10/1978 Binder ................. A63B 21/169 606/237
4,493,315 A * 1/1985 Iwahashi ................ A61H 7/001 601/135
4,861,022 A * 8/1989 Boatcallie .......... A63B 23/1254 482/126
5,488,755 A * 2/1996 Chang .................... A63B 23/16 16/DIG. 12
5,507,712 A 4/1996 Chang
5,662,562 A * 9/1997 Wohlenberg ........... A61H 1/024 482/907
5,746,705 A * 5/1998 Sheppard .............. A61F 5/3738 602/5
5,984,845 A * 11/1999 Powers .................. A63B 23/00 482/148
6,129,650 A * 10/2000 Wedge, Jr. ......... A63B 21/0004 482/44
7,717,834 B2 * 5/2010 Kay ................. A63B 21/00065 482/148
D646,794 S * 10/2011 Hennessey ................... D24/214
8,234,755 B1 * 8/2012 Brand ...................... A61H 3/04 16/427
8,545,373 B2 10/2013 Borden
8,801,639 B2 * 8/2014 Malosio ............... A61H 1/0277 601/2
8,808,208 B2 * 8/2014 Mouatt .............. A63B 21/0552 601/134
8,852,063 B2 10/2014 Bua
8,973,200 B2 * 3/2015 Mallett ................ A46B 5/0095 16/430
9,498,399 B1 * 11/2016 Juntunen ............ A63B 69/0062
9,999,563 B2 * 6/2018 Bond ..................... A61H 7/003
10,173,093 B2 1/2019 Shi
10,327,981 B1 * 6/2019 Ayotte ................... A61H 1/008
10,441,452 B1 10/2019 Al-Oboudi
D947,399 S * 3/2022 Mao ............................. D24/214
D947,400 S * 3/2022 Mao ............................. D24/214
11,376,185 B2 * 7/2022 Nash ...................... A61H 15/00
D1,006,243 S * 11/2023 Savioli ......................... D24/214
2004/0087419 A1 5/2004 Ware
2004/0180764 A1 * 9/2004 Patton .................... A63B 23/00 482/110
2005/0233839 A1 * 10/2005 Adams ................... A63B 60/00 473/513
2007/0225620 A1 9/2007 Carignan et al.
2007/0256718 A1 * 11/2007 Diaz ........................ A61H 3/02 135/72
2008/0312053 A1 * 12/2008 Kay ................... A63B 21/4005 482/124
2010/0234192 A1 9/2010 Oller, Jr.
2010/0317495 A1 * 12/2010 DiGiovanni ......... A63B 21/151 482/129
2011/0294634 A1 * 12/2011 Bua ...................... A61H 1/0281 482/139
2012/0060878 A1 * 3/2012 Thiessens ............. A45B 7/005 294/104
2012/0271345 A1 * 10/2012 Torres .................... A61H 7/001 606/204
2013/0023807 A1 * 1/2013 Hennessey ............. A61H 7/003 601/119
2013/0066245 A1 * 3/2013 Dagan .................... A61H 7/003 601/118
2013/0237883 A1 * 9/2013 Malosio ............... A61H 1/0281 601/33
2013/0289454 A1 * 10/2013 Wang ..................... A61H 15/00 601/132
2014/0228722 A1 * 8/2014 Nelson ............... A61H 15/0092 601/125
2015/0018731 A1 * 1/2015 La Peer ................. A61H 39/04 601/135
2016/0022529 A1 * 1/2016 Abdo ..................... A61H 15/00 601/119
2016/0151235 A1 * 6/2016 Yu ...................... A61H 15/0092 601/135
2016/0279010 A1 * 9/2016 Lutz ....................... A61H 1/024
2016/0317852 A1 * 11/2016 Harrison ............ A63B 21/4017
2017/0056284 A1 * 3/2017 Kramer .............. A61H 15/0092
2019/0099323 A1 * 4/2019 Nelson ............... A61H 15/0092
2019/0274915 A1 * 9/2019 Cross ................. A61H 15/0092
2020/0246214 A1 * 8/2020 Nelson ................... A61H 15/00
2022/0395427 A1 * 12/2022 Ford .................... A61H 23/004
2024/0099921 A1 * 3/2024 Sawyers .............. A61H 1/0281

OTHER PUBLICATIONS

Cap Barbell Store, Cap Barbell Exercise Machine Attachment | T-Row, Eyelet, Plate Insert, Row Platform, Amazon Website Screenshot, Dec. 5, 2019.

* cited by examiner

ADJUSTABLE, MULTI-FUNCTIONAL SHOULDER STRETCHING DEVICE

TECHNICAL FIELD

The field relates to a multi-functional shoulder stretching device. The device is adjustable and can be used in a variety of positions around a user's body to stretch a variety of muscles.

BRIEF DESCRIPTION OF THE FIGURES

The features and advantages of the embodiments will be more readily appreciated when considered in conjunction with the accompanying figures. The figures are not to be construed as limiting any of the embodiments.

DETAILED DESCRIPTION

Figure 1:
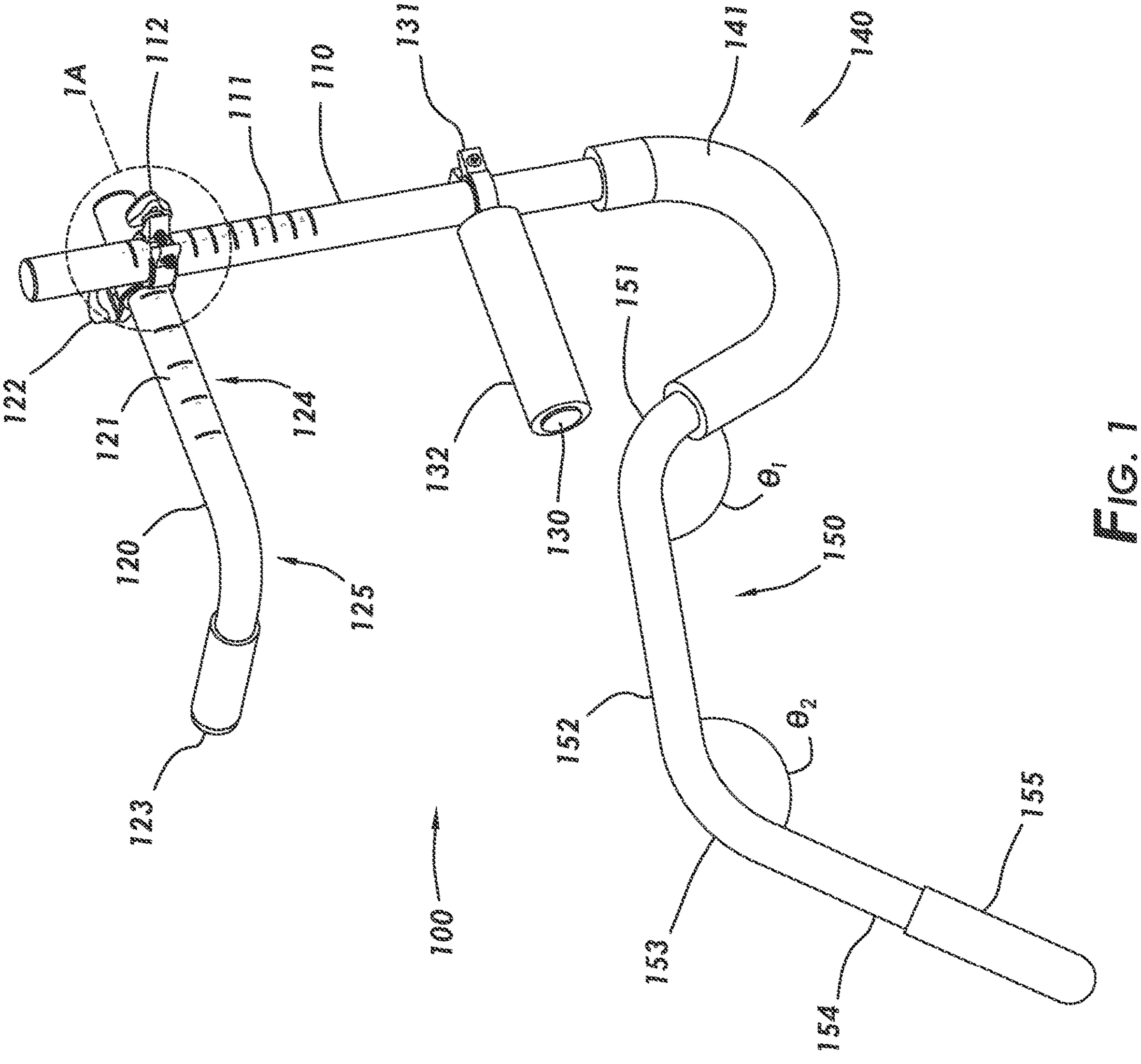
FIG. 1A is a front, perspective view of a shoulder stretching device according to certain embodiments.
FIG. 1B is an exploded view of an adjustment lock of FIG. 1 according to certain embodiments.
Figure 1A:
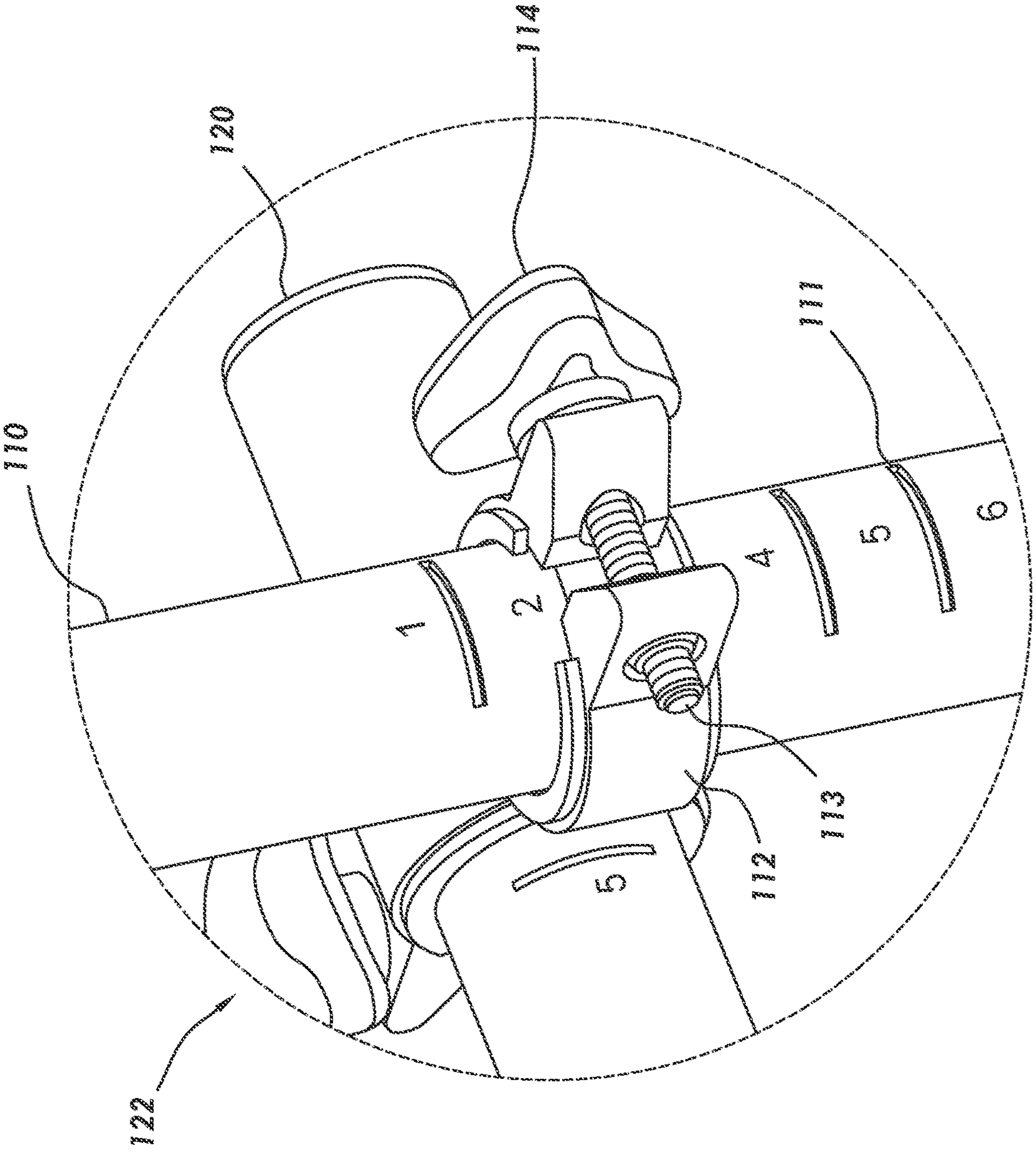

Stretching and exercising the muscles, joints, tendons, etc. in the shoulder region may be desirable or necessary for a variety of reasons. For example, stretching exercises are frequently used if an injury occurs to possibly avoid surgery. Post-operative exercises are also frequently ordered to help stretch and strengthen muscles after surgery. Athletes and people who lift weights also frequently stretch targeted muscles before and/or after a workout.

A doctor may order a patient to undertake physical therapy, for example after an injury or surgery. Typically, the patient meets with the physical therapist in person and is shown how to properly perform various stretching and/or strengthening exercises. Oftentimes, specialized equipment can only be used at the physical therapist's building. Therefore, for shoulder exercises, the patient may have to use bands or other household items (e.g., broom sticks, hammers, or pipes) at home to simulate the specialized equipment. Currently, no specialized shoulder stretching device exists that can be used by a physical therapist, for example, during in-person instruction and also be used at home by the patient.

The targeted muscles to be stretched can differ and can change. For example, dead lifts may work different muscles than bench press. Accordingly, the targeted muscles to be stretched can change from workout to workout. The targeted muscles may also change during a course of physical therapy as a patient progresses through treatment. Current device designs are not multi-functional and do not allow a user to stretch and/or strengthen a variety of muscles in and around the shoulder region. Moreover, current designs do not allow the device to be customized based on a user's size to provide a proper fit of the device to each patient for the maximum effect. Moreover, current designs are not progressive and do not provide a measurable range of positions that allow a user to increase or decrease the difficulty level or the amount of stretch and/or strengthening.

Thus, there is a need for a shoulder stretching device that solves the problems of current designs. It has been discovered that a shoulder stretching device can be used during treatment and at home, allows more muscles or tendons to be stretched and strengthened, is multi-functional, customizable, and allows a user to increase or decrease the amount of stretch or strengthening. It is to be understood that reference to "muscles" is not limited to only muscles, but also includes ligaments, tendons, joints, etc. without the need to repeat the entire list throughout.

A shoulder stretching device can include a longitudinal member; a top transverse member releasably connected to a top end of the longitudinal member; a forearm member releasably connected to the longitudinal member; a curved elbow member connected to a bottom end of the longitudinal member; and a bottom transverse member indirectly connected to the longitudinal member via the curved elbow member, wherein the top transverse member, the forearm member, and the bottom transverse member are oriented perpendicularly to a longitudinal axis of the longitudinal member.

It is to be understood that the discussion of any of the embodiments regarding the shoulder stretching device is intended to apply to all of the apparatus and method embodiments without the need to repeat the various embodiments throughout.

Figure 2:
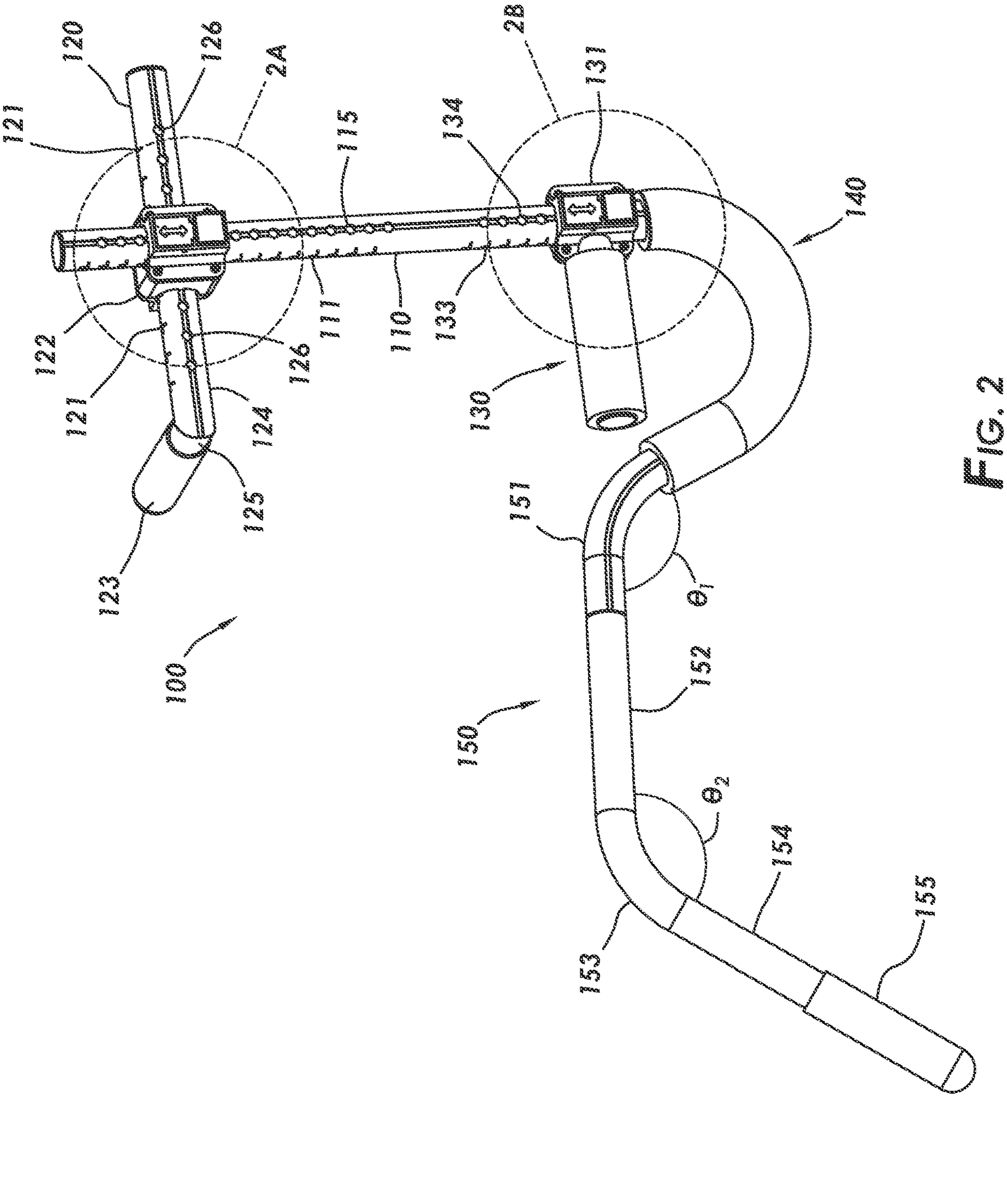
FIG. 2 is a front, perspective view of a shoulder stretching device according to certain other embodiments.
Figure 3:
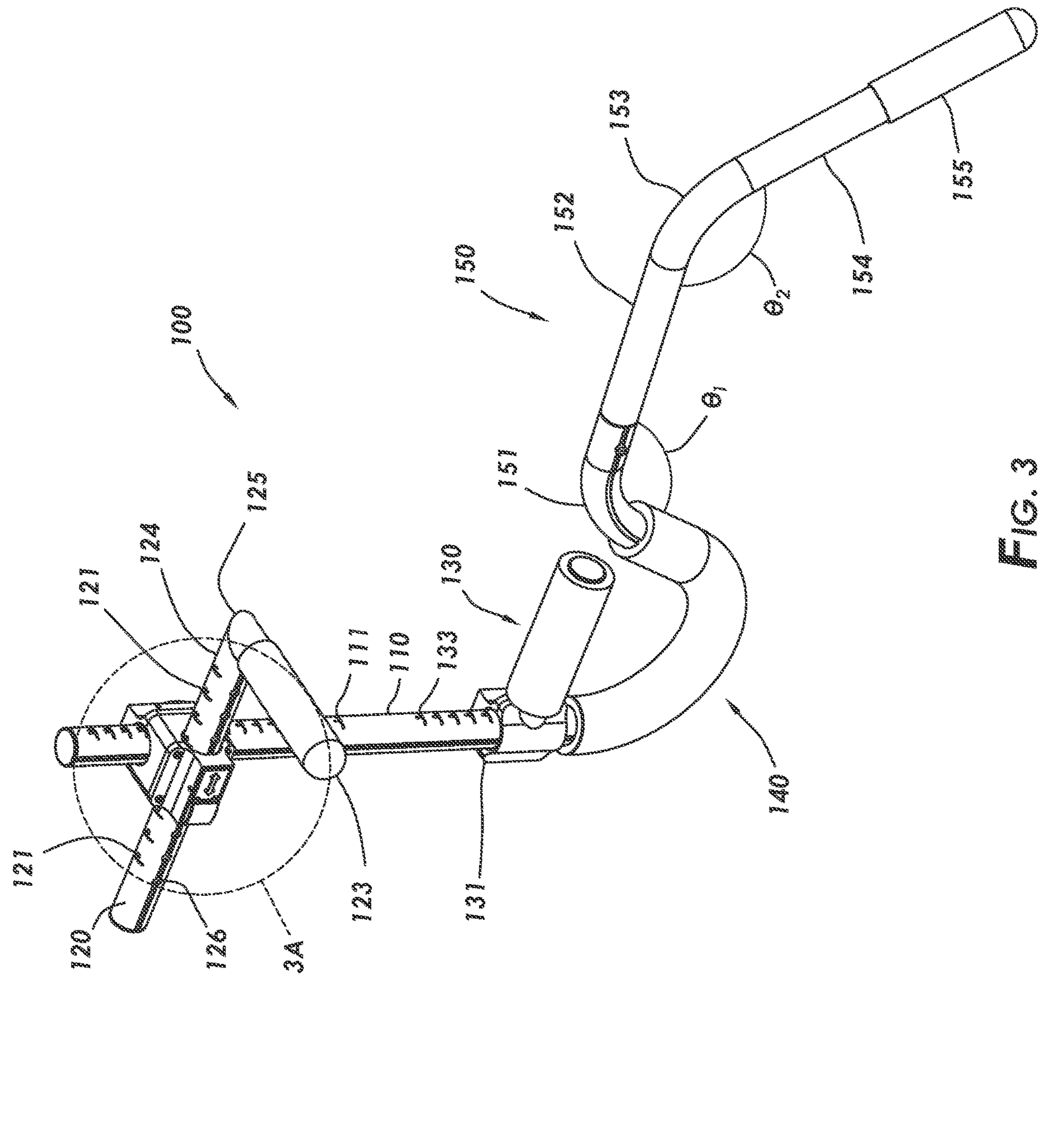
FIG. 3 is a back, perspective view of the shoulder stretching device of FIG. 2.

Turning to the figures, FIGS. 1, 2, and 3 show a shoulder stretching device 100 according to certain embodiments. The shoulder stretching device can include a substantially straight longitudinal member 110. The longitudinal member 110 can have a variety of lengths ranging for example, from 12 to 48 inches (30.5 to 121.9 centimeters "cm"). The longitudinal member 110 can have a top portion, middle portion, and a bottom portion (not labeled). The longitudinal member 110 can be cylindrical in shape and include a longitudinal axis. The longitudinal member 110 can be solid, hollow, or include both solid and hollow portions.

Figure 5:
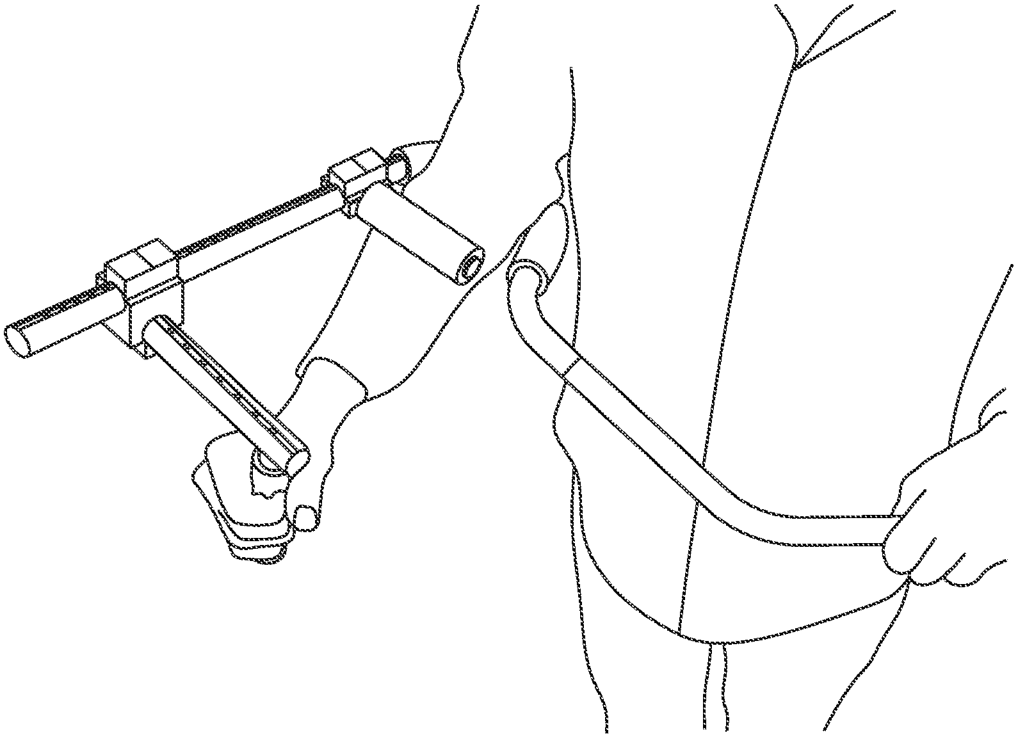
FIGS. 5-10B are perspective views of the shoulder stretching device showing how the device can be used by a user according to certain embodiments.
Figure 6:
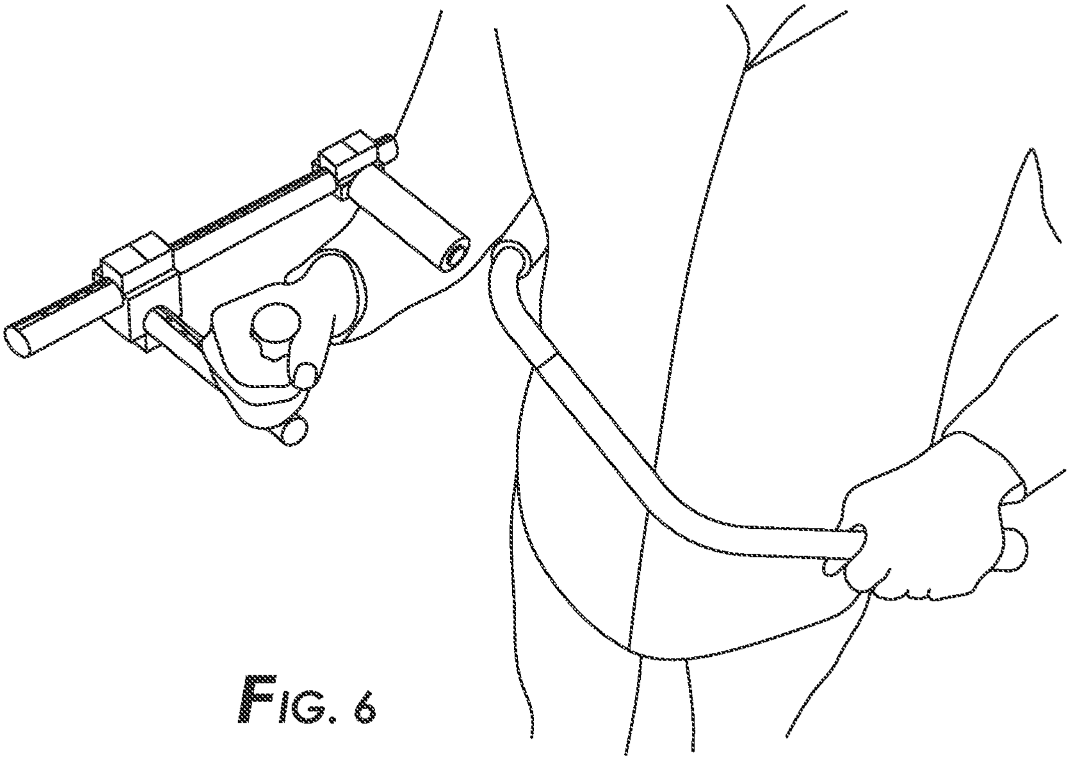

Beginning at a top portion of the longitudinal member 110, the shoulder stretching device 100 can include a top transverse member 120 located near the top portion of the longitudinal member 110. The top transverse member 120 can be cylindrical in shape or other shapes, such as triangular or square. The top transverse member 120 can include a substantially straight portion 124 having a longitudinal axis that is oriented perpendicular to the longitudinal axis of the longitudinal member 110. As can also be seen, the top transverse member 120 can also include an angled portion 125. A handgrip 123 can be included at a terminal end of the angled portion 125. The handgrip 123 can include a slip-resistant material surrounding all or a portion of the handgrip 123. A longitudinal axis of the angled portion 125 can form an angle between the longitudinal axis of the straight portion 124 and the handgrip 123. The angle can be in the range, for example, between 45° and 170°. By way of example, the angle is shown in FIG. 1 as being greater than 90° and shown in FIGS. 2 and 3 as being less than or equal to 90°. The angle can be selected to provide varying levels of stretching/strengthening. The angled portion 125 can also be conjoined to the straight portion 124 via a hinge (not shown) that allows the handgrip 123 to be swung away from or towards the longitudinal member 110. By way of example and with reference to FIGS. 5 and 6, the angled portion 125 can begin at an angle of 90° and pointing down during use as shown in FIG. 5. If a user desires to adjust the handgrip 123 to be pointing up as shown in FIG. 6, then the user can release the hinge and swing the handgrip 123 past 180° away from the longitudinal member 110 and into a 90° angle pointing up. Of course, the handgrip 123 can be swung into different angles besides 90° in relation to a longitudinal axis of the straight portion 124.

Figure 3A:
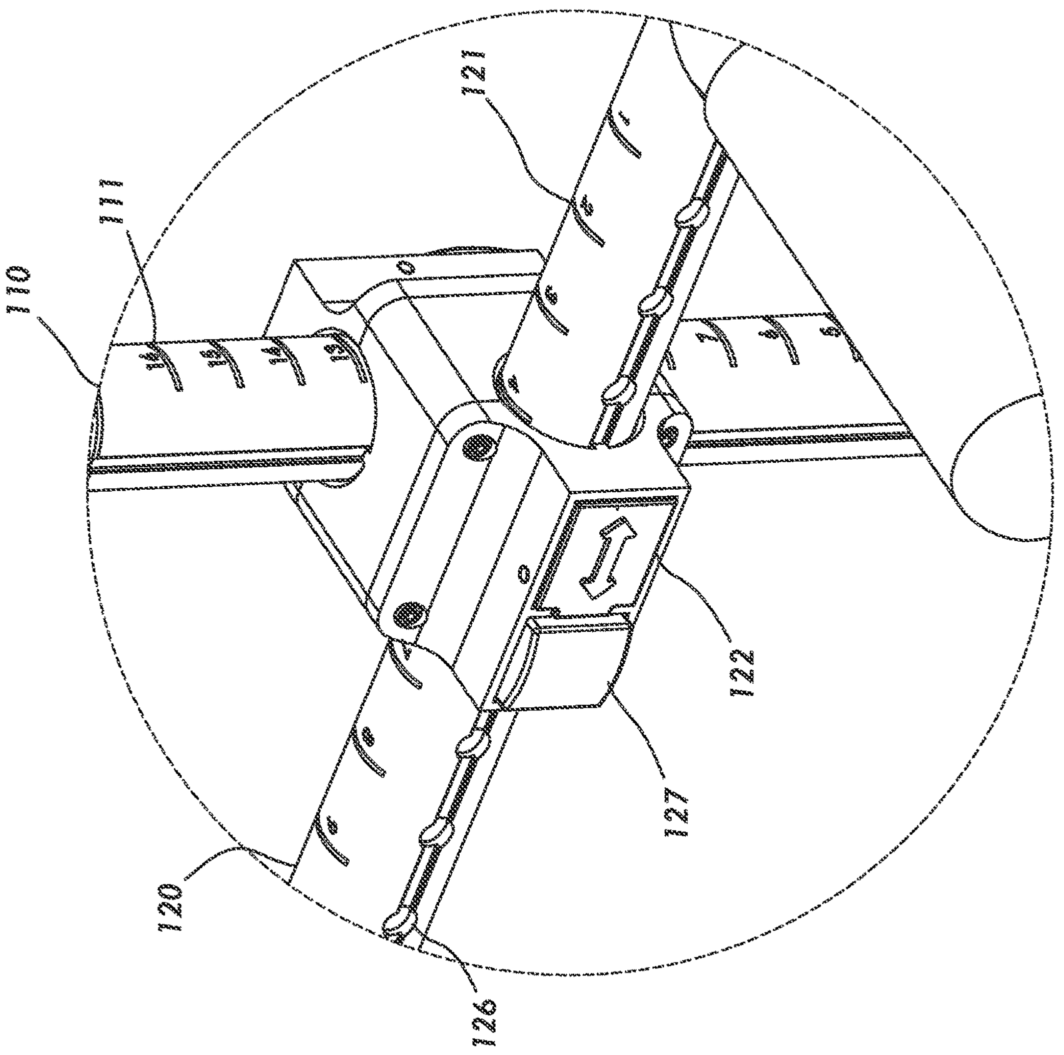
FIG. 3A is an exploded view of an adjustment lock of FIG. 3 according to certain embodiments.

The straight portion 124 of the top transverse member 120 can have a length ranging from 2 to 24 inches (5 to 61 cm), for example. As shown in FIGS. 1, 2, and 3, the straight portion 124 can extend away from the longitudinal member 110 on both sides of the longitudinal member 110. The length that extends away from the longitudinal member 110 can be different on either side of the longitudinal member 110 and is adjustable. By way of example, and as shown in FIGS. 1B and 3A, the straight portion 124 of the top transverse member 120 can be slid through an adjustment lock 122 to move the handgrip 123 closer to or farther away from the longitudinal member 110 and can be used to select the desired length extending away from the longitudinal member 110 on either side.

Figure 4B:
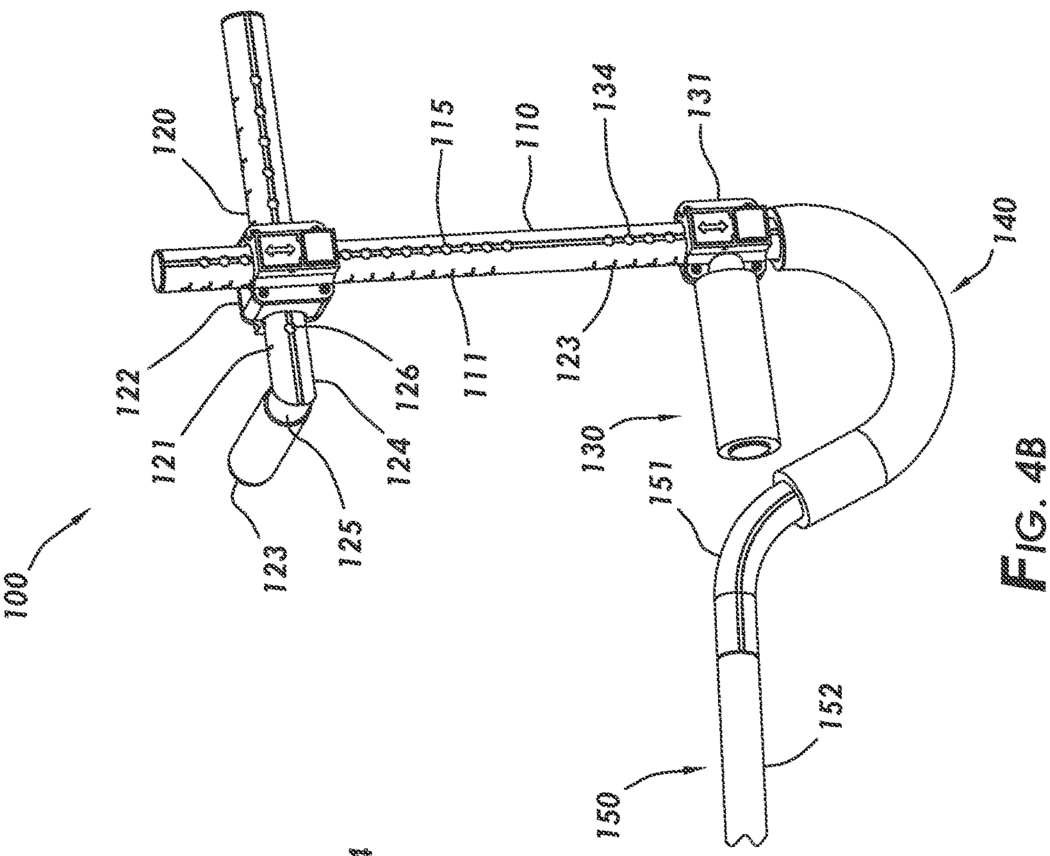
FIGS. 4A-4D are front, perspective views of the shoulder stretching device showing various adjustments for varying the difficulty level according to certain embodiments.
Figure 4A:
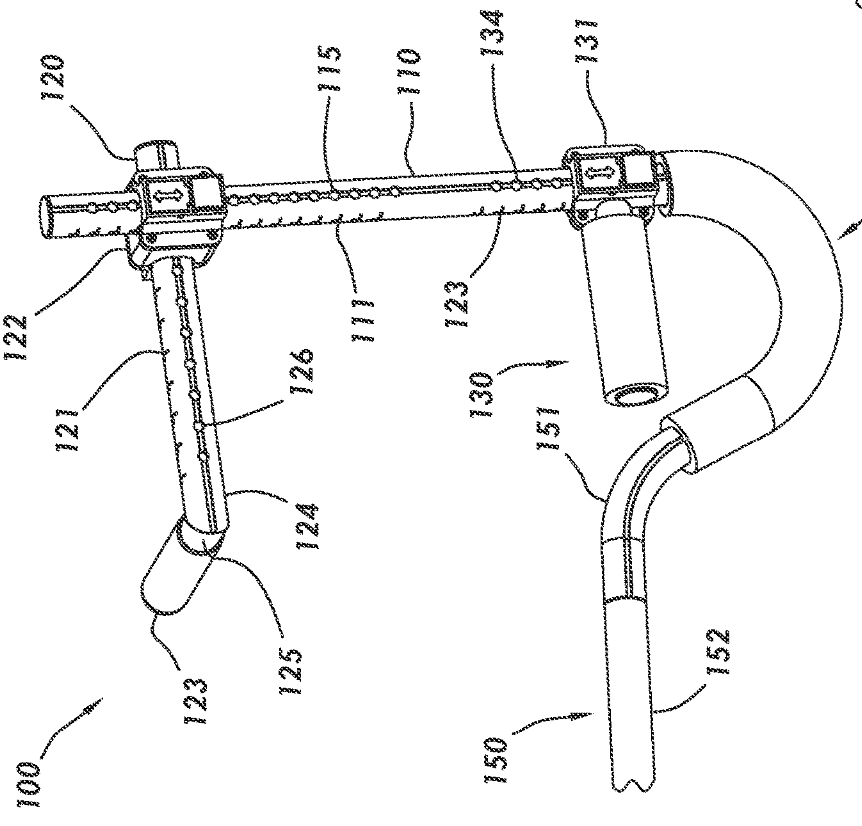
Figure 4D:
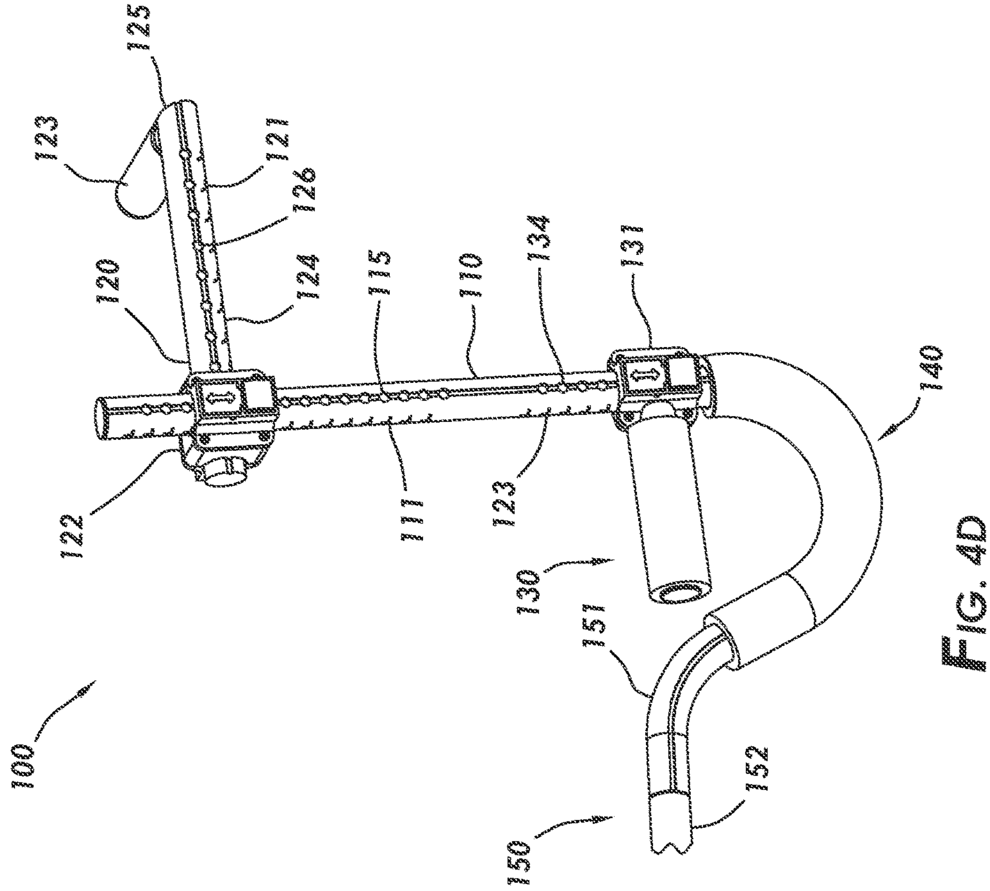
Figure 4C:
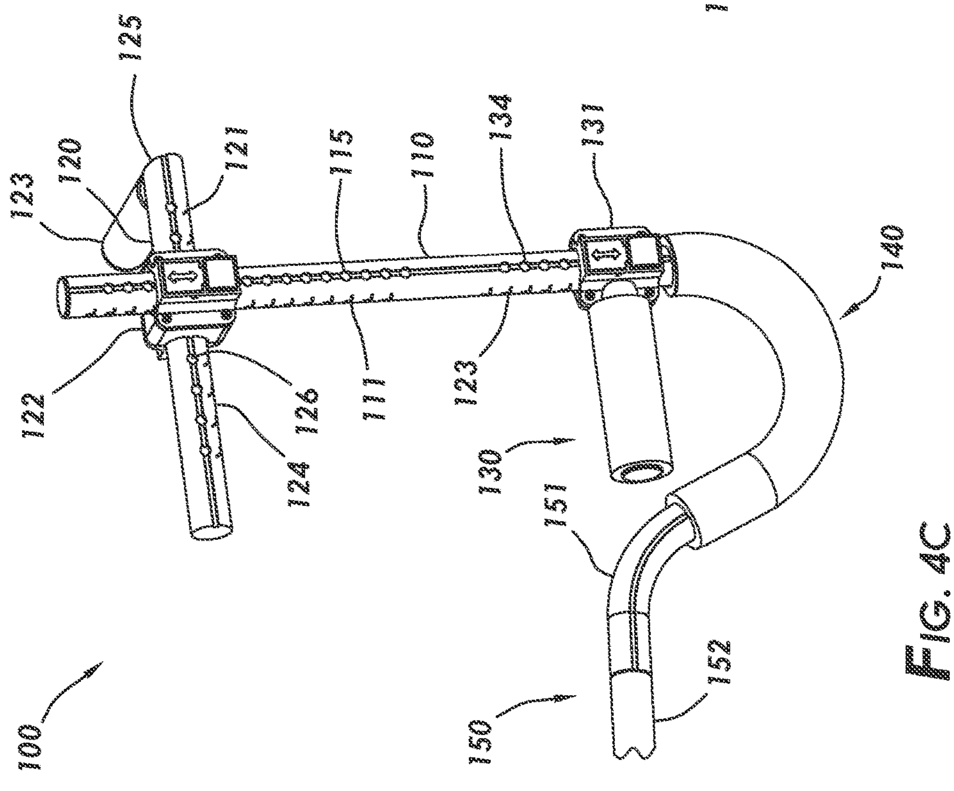

The straight portion 124 of the top transverse member 120 can include one or more adjustment indicators 121. The adjustment indicators 121 can be used in conjunction with the adjustment lock 122 to position the top transverse member 120 in relation to the longitudinal member 110 such that a desired length of the top transverse member 120 extends from either side of the longitudinal member 110. By way of example and as shown in FIGS. 4A and 4B, the adjustment lock 122 can be released and the top transverse member 120 can be slid through the adjustment lock 122 to position the handgrip 123 farther away from the longitudinal member 110 for a beginner's minimum difficulty level shown in FIG. 4A and to position the handgrip 123 closer to the longitudinal member 110 for a beginner's maximum difficulty level shown in FIG. 4B. As shown in FIGS. 4C and 4D, the handgrip 123 can be positioned on the opposite side of the longitudinal member 110 and facing the same direction from what is shown in FIGS. 4A and 4B. By way of a first example, the top transverse member 120 can be removed from the adjustment lock 122 and then reinserted into the adjustment lock 122 from the opposite side of the longitudinal member 110 such that the handgrip 123 is located on the opposite side of the longitudinal member 110. By way of a second example, the adjustment locks 112/122 can be removed from the longitudinal member 110 along with the top transverse member 120 for example by sliding the locks up and past the top of the longitudinal member 110. The top transverse member 120 and locks 112/122 can then be flipped over such that the handgrip 123 is now located on the opposite side of the longitudinal member and the locks 112/122 can be repositioned onto the longitudinal member. By way of a third example, the adjustment lock 122 can be configured such that the top transverse member 120 can be rotated clockwise or counterclockwise in relation to the longitudinal axis of the longitudinal member 110 in order to position the handgrip 123 on the opposite side of the longitudinal member 110, for example, by rotating the top transverse member 120 clockwise 180°. The adjustment indicators 121 and adjustment lock 122 can then be used to position the handgrip 123 closer to the longitudinal member 110 for an advanced minimum difficulty level shown in FIG. 4C and to position the handgrip 123 farther away from the longitudinal member 110 for an advanced maximum difficulty level shown in FIG. 4D. Accordingly, the shoulder stretching device 100 is multi-functional and adjustable.

Figure 7:
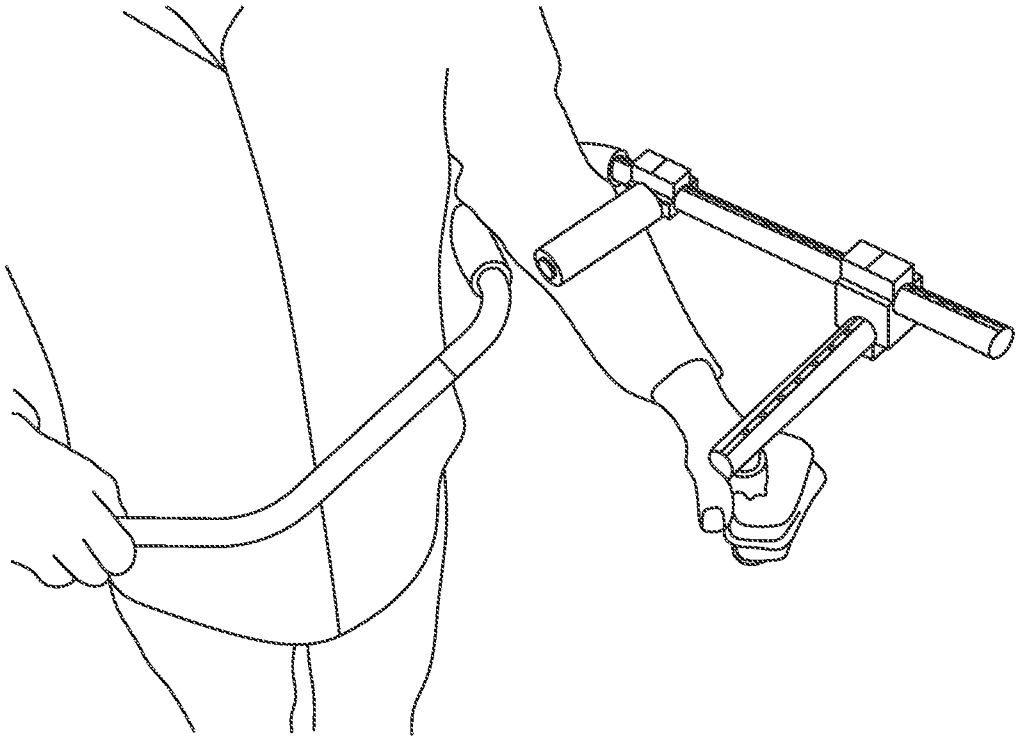
Figure 8:
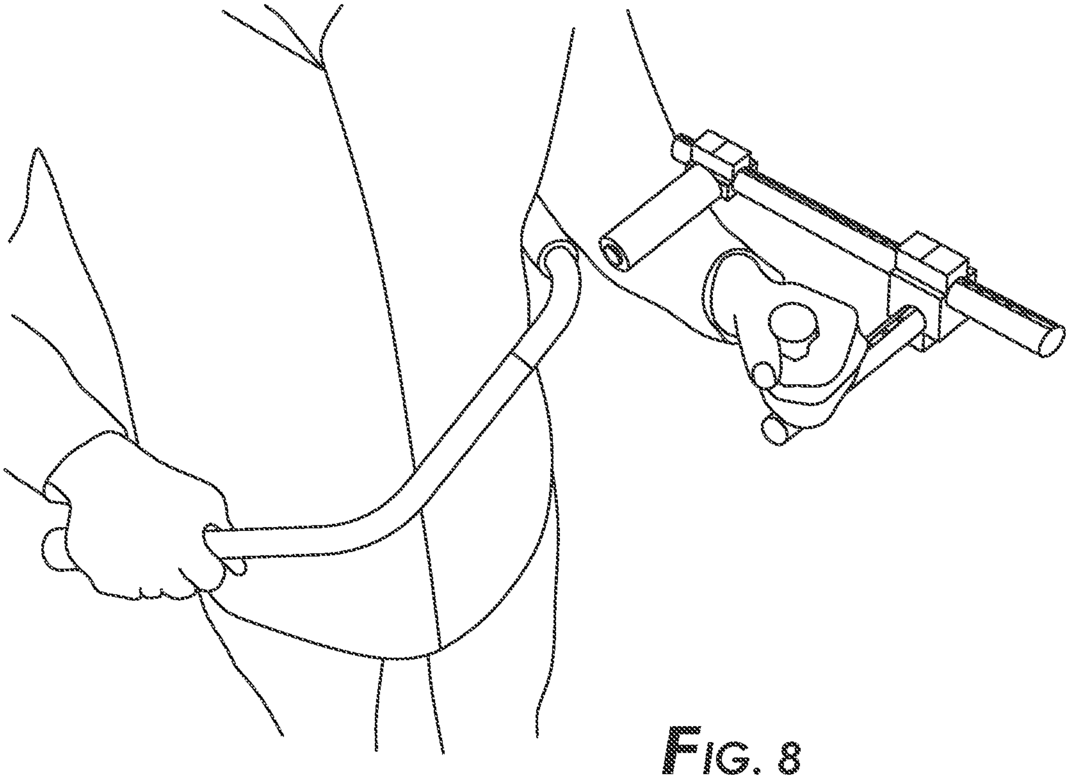
Figure 9B:
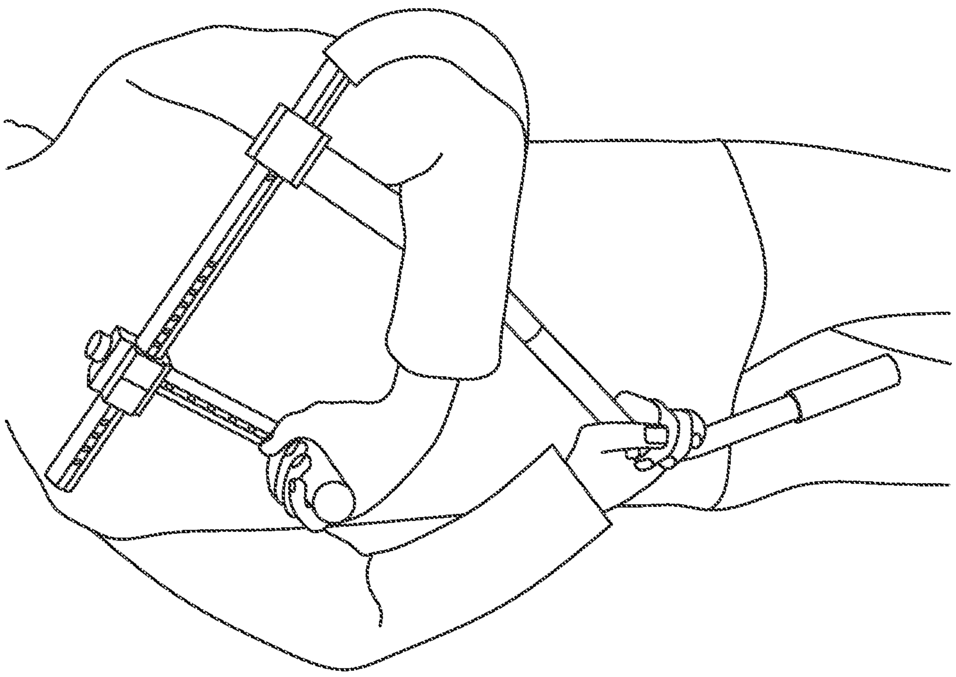
Figure 9A:
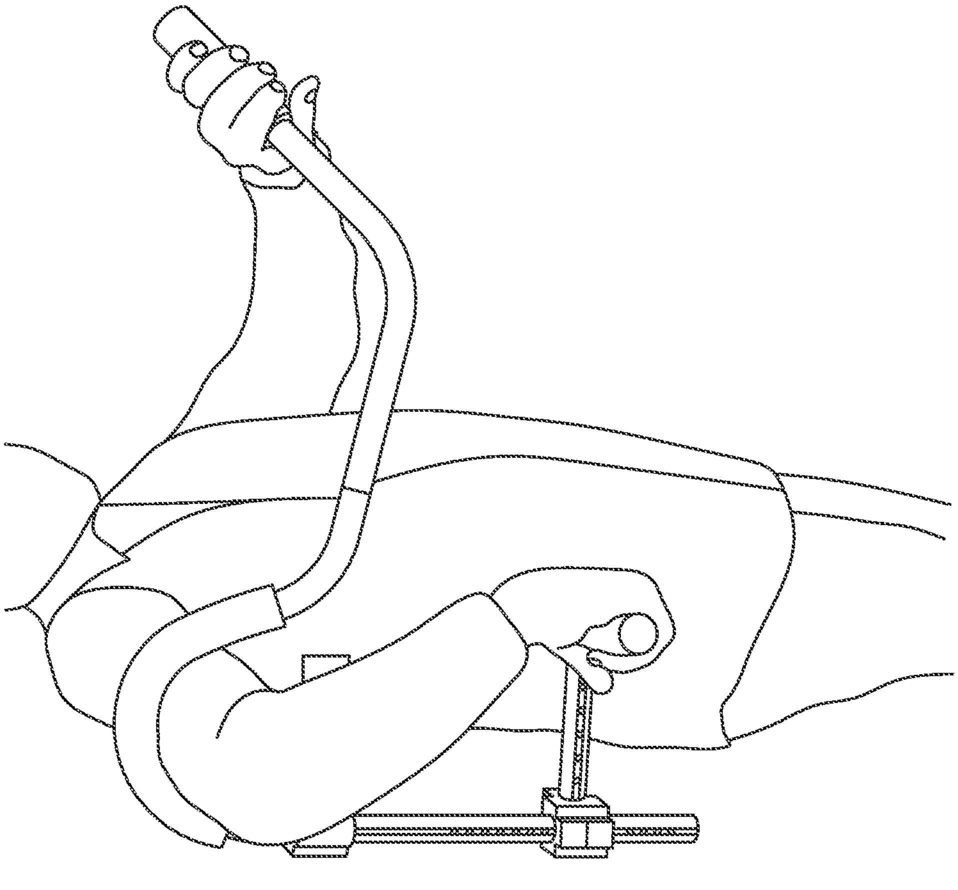
Figure 10B:
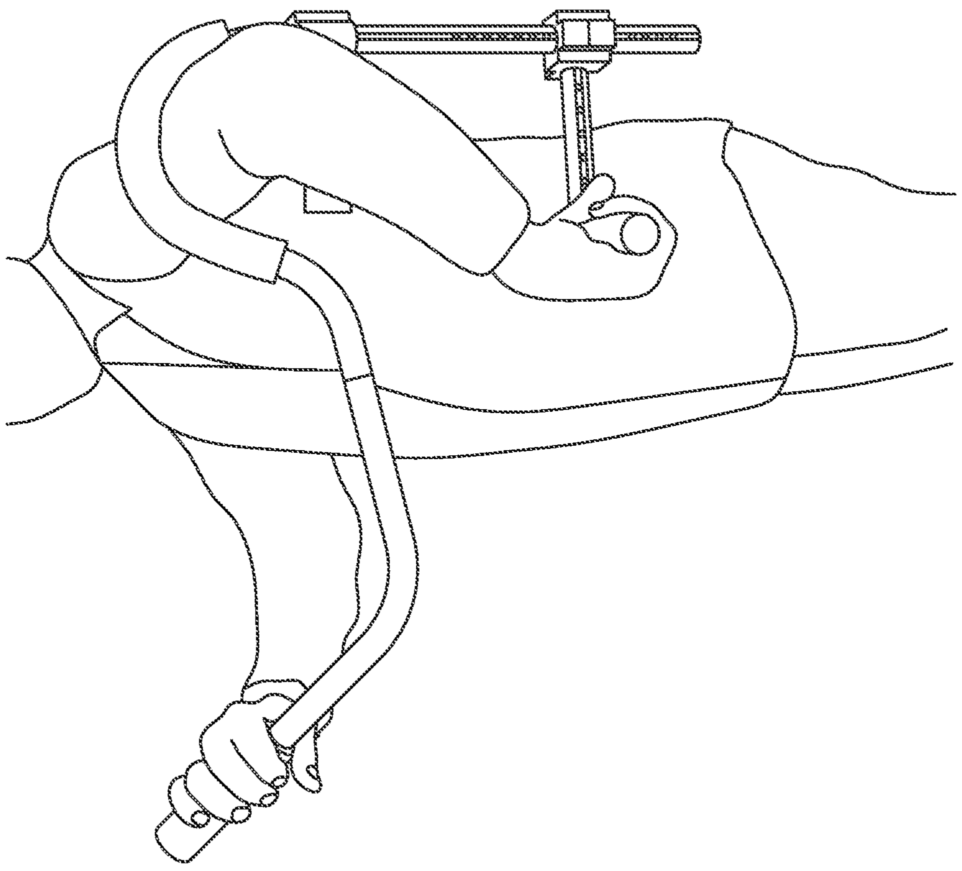
Figure 10A:
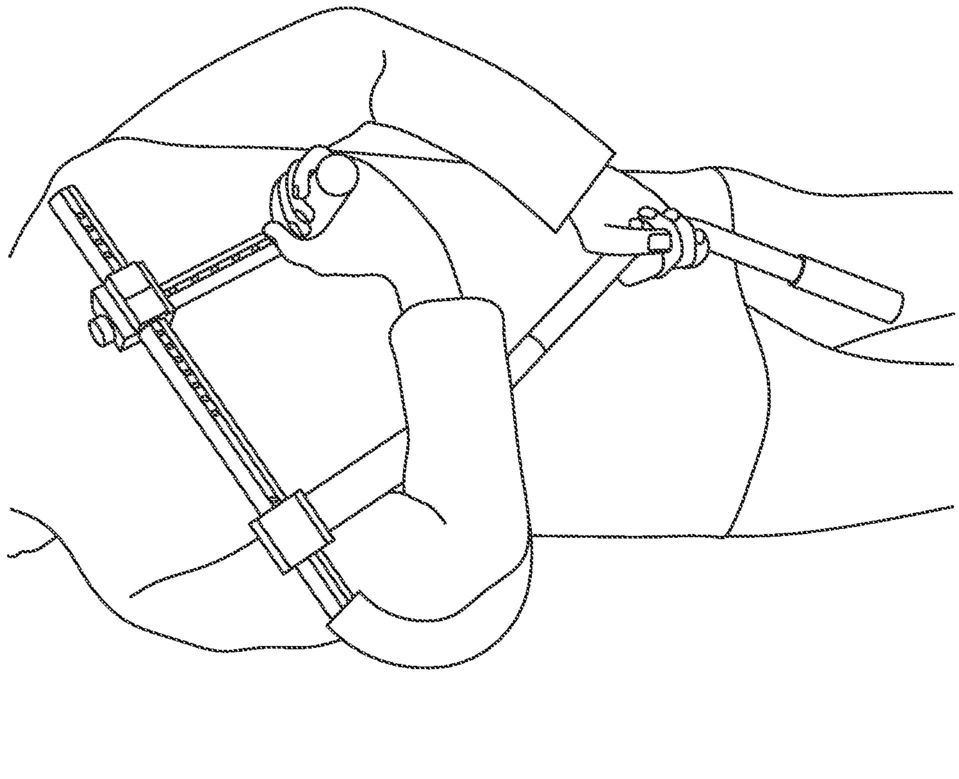

The top transverse member 120 can also rotate clockwise or counterclockwise within the adjustment lock 122 to adjust the orientation of the handgrip 123 in relation to the longitudinal axis of the longitudinal member 110. By way of example, the top transverse member 120 can be rotated within the adjustment lock 122 such that the handgrip 123 is oriented up as shown in FIG. 6 or oriented down as shown in FIG. 7. As used herein, the relative terms "up" and "down" are for illustrative purposes only and mean an orientation of the end of the handgrip in relation to a plane of a floor when in use. Although shown as being rotated 180° from up to down or vice versa, it is to be understood that the top transverse member 120 can be rotated in any number of degrees—including degrees less than 180°.

The top transverse member 120 can also be rotatable around the top end of the longitudinal member 110, for example, via a vertical adjustment lock 112. The top transverse member 120 can be rotated 360° around the longitudinal axis of the longitudinal member 110. By way of example and as shown in FIG. 7, the top transverse member 120 is rotated around the longitudinal axis of the longitudinal member 110 such that the straight portion 124 is not in-line with a first straight portion 152 of a bottom transverse member 150.

The top transverse member 120 can also be moved further down or closer to the top end of the longitudinal member 110, for example by releasing the vertical adjustment lock 112 and sliding the top transverse member 120 and the vertical adjustment lock 112 along the longitudinal member 110. The top end of the longitudinal member 110 can include one or more adjustment indicators 111 to aid a user in a desired placement of the top transverse member 120 along the longitudinal member 110. The desired placement of the top transverse member 120 along the longitudinal member 110 can be based in part on the length of a user's forearm such that the user is able to securely grasp the handgrip 123 when in use.

Figure 2B:
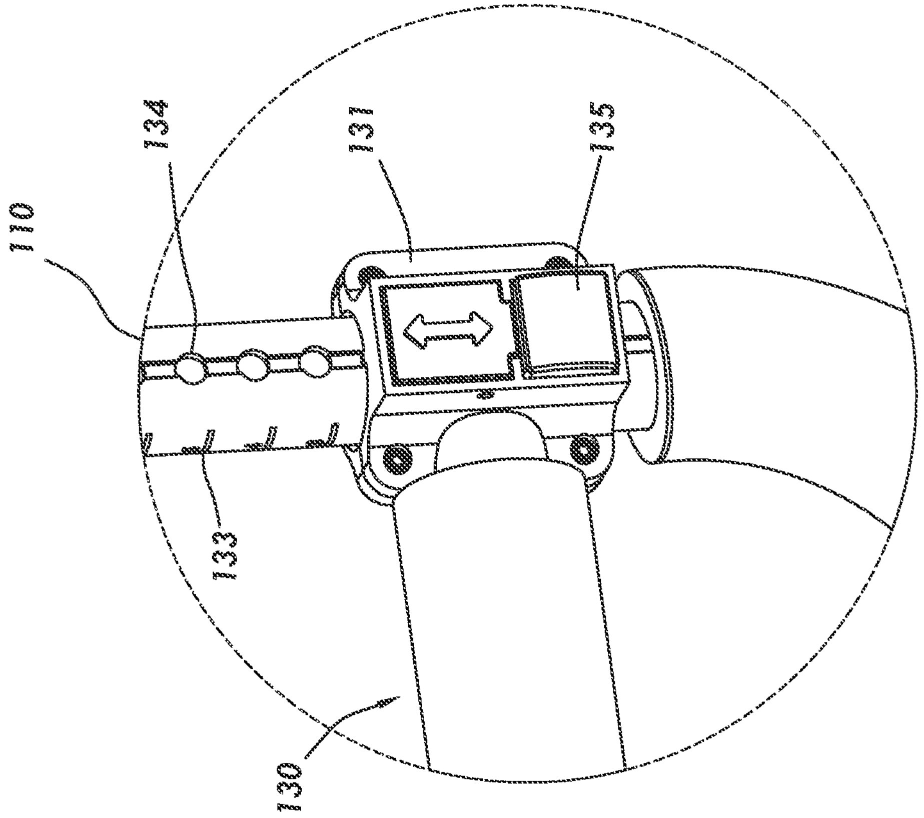
FIGS. 2A and 2B are exploded views of adjustment locks of FIG. 2 according to certain other embodiments.
Figure 2A:
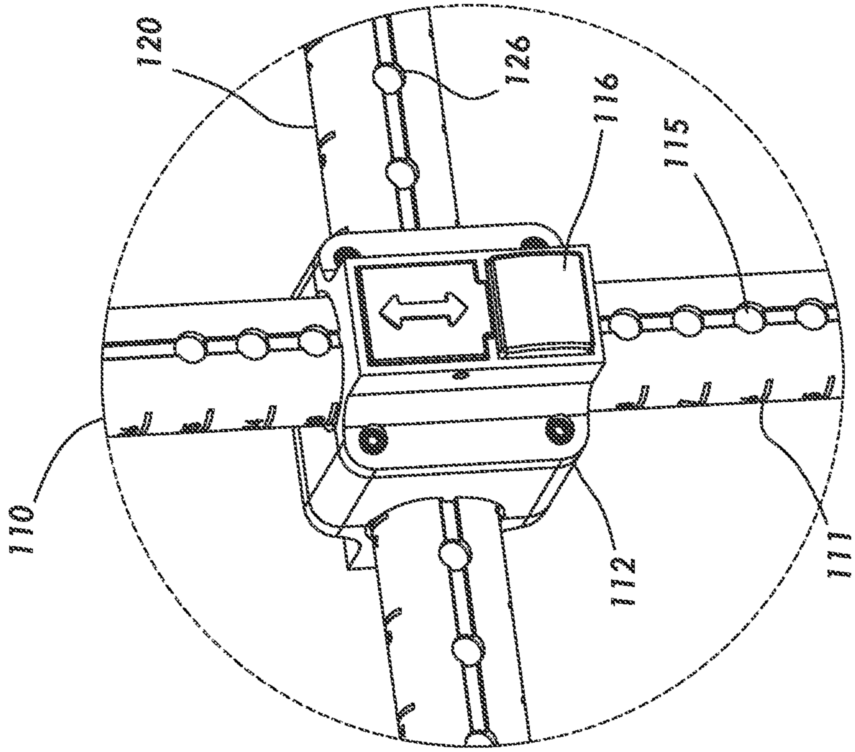

FIG. 1B is an exploded view of the vertical adjustment lock 112 and the adjustment lock 122 according to certain embodiments. FIGS. 2A and 3A are exploded views of the vertical adjustment lock 112 and the adjustment lock 122 according to certain other embodiments. The vertical adjustment lock 112 and the adjustment lock 122 can include one or more components that allow movement of the top transverse member 120 through the locks 112/122 in a lateral and longitudinal direction with respect to the longitudinal axis of the longitudinal member 110. The one or more components of the locks 112/122 can also be used to allow rotation of the top transverse member 120 perpendicularly and longitudinally as discussed above. The locks 112/122 can include a locking mechanism that secures the top transverse member 120 in the desired orientation in relation to the longitudinal member 110 after adjustment, for example, by using the adjustment indicators 111/121.

According to any of the embodiments and as shown in FIGS. 1 and 1B, both of the adjustment locks 112/122 can include a concave body (not labeled) configured to receive the longitudinal member 110 and the top transverse member 120, respectively. The concave bodies can include an opening and two protrusions extending away from the concave bodies. The adjustment locks 112/122 can include a threaded rod 113 that traverses through both of the protrusions and can matingly engage with threads on the protrusions. A hand knob 114 can be attached to the threaded rod 113 at one end. The hand knob 114 can be turned counterclockwise in relation to the threaded rod 113 to release tension on the longitudinal member 110 and the top transverse member 120. In this manner, the longitudinal member 110 or the top transverse member 120 can then be moved vertically or perpendicularly in relation to the longitudinal axis of the longitudinal member 110 to a desired location. Once the longitudinal member 110 and the top transverse member 120 are moved to the desired location, the hand knob 114 can be rotated clockwise in relation to the threaded rod 113 to create tension on the members 110/120 in order to lock the members 110/120 at the desired location.

According to any of the embodiments and as shown in FIGS. 2, 2A, 3, and 3A, the longitudinal member 110 can include a plurality of locking mechanism receivers 115 located along an outside of the top end of the longitudinal member 110 and adjacent to the adjustment indicators 111. The top transverse member 120 can include a plurality of locking mechanism receivers 126 located along an outside of one end of the top transverse member 120 and adjacent to the adjustment indicators 121. The locking mechanism receivers 115/126 can be cup-shaped indentations or holes that penetrate from an outside of the members 110/120 through to an inside of the members 110/120 (in the case the members 110/120 are hollow on the inside). The adjustment locks 112/122 can each include release button 116/127. The release button 116/127 can be depressed, which causes an internal protrusion from disengaging with the locking mechanism receivers 115/126, thereby allowing the movement of the members 110/120 vertically or perpendicularly in relation to the longitudinal axis of the longitudinal member 110 to a desired location. Once the longitudinal member 110 and the top transverse member 120 are moved to the desired location, depression of the release button 116/127 can be removed to cause the internal protrusion to engage with a particular locking mechanism receiver 115/126 in order to lock the members 110/120 at the desired location. It is possible that after the depression of the release buttons is removed, a user may need to move the members 110/120 slightly along or perpendicular to the longitudinal axis of the longitudinal member 110 until there is an indication that the internal protrusion has completely engaged with the locking mechanism receivers 115/126 (e.g., by hearing an audible click or inability to move the member any further along or perpendicular to the longitudinal axis).

It is to be understood that each of the longitudinal member 110 and the top transverse member 120 can be adjusted to a desired position independently, wherein adjustment of one of the members may not require adjustment of the other member. Of course, both of the members 110/120 can be adjusted as needed or desired. According to any of the embodiments and as shown, for example, in FIG. 1B, a back side of the concave body of the vertical adjustment lock 112 is permanently attached to a front side of the concave body of the adjustment lock 122 such that releasing tension on the vertical adjustment lock 112 allows the top transverse member 120 and both of the adjustment locks 112/122 to move together along the longitudinal axis of the longitudinal member 110. By way of another example and as shown in FIGS. 2A and 3A, the vertical adjustment lock 112 and the adjustment lock 122 can be formed as a single unit comprising both locks such that depression of the release button 116 allows the top transverse member 120 and both of the adjustment locks 112/122 to move together along the longitudinal axis of the longitudinal member 110.

With reference and moving farther down the longitudinal member 110 towards a bottom portion, the shoulder stretching device 100 can include a forearm member 130. The forearm member 130 can be adjustably connected to the longitudinal member 110 via an adjustment lock 131. The adjustment lock 131 can be configured like the adjustment locks 112/122 as shown in FIGS. 1 and 1B or as shown in FIGS. 2 and 2B. As shown in FIG. 2B, for example, the bottom portion of the longitudinal member 110 can include a plurality of adjustment indicators 133 and a plurality of locking mechanism receivers 134. An adjustment lock 131 can include a release button 135 or a threaded rod and hand knob (not labeled). The forearm member 130 can be adjusted and moved vertically along the longitudinal axis of the longitudinal member 110 using the components like as discussed above. The forearm member 130 can also be adjusted rotationally around the longitudinal axis of the longitudinal member 110 like as discussed above. All of or a portion of the forearm member 130 can be covered with padding 132 located around an outside of the forearm member.

The plurality of adjustment indicators 111/121/131 can be in the form of lines or notches, or lines or notches and numbers. The numbers can be positive integers and can have 1-unit increments (i.e., 1, 2, 3, 4, etc.) or 2- or 3-unit increments (i.e., 2, 4, 6, etc. or 1, 3, 6, 9, etc.) between each line and number. The increments can represent a unit of length. Accordingly, the distance between each indicator can represent the unit increments in inches or fractions of an inch. By way of a first example, the distance between 1-unit increments for an indicator numbered 1 and indicator numbered 2 can correspond to a distance of 1 inch or 0.5 inches. By way of a second example, the distance between 2-unit increments for an indicator numbered 2 and indicator numbered 4 can correspond to a distance of 1 inch or 2 inches. A user, with or without instruction from a physical therapist or other instructor, can adjust the top transverse member and forearm member to a desired location for a specific exercise based on their arm and torso lengths and then remember or write down the specific number for each of the plurality of adjustment indicators. In this manner, when switching between exercises, a user can quickly adjust the top transverse member and forearm member to the appropriate locations.

With reference and moving farther down the longitudinal member 110 below the forearm member 130, the shoulder stretching device 100 can include a curved elbow member 140. As shown, the elbow member 140 can have a U-shaped configuration. The elbow member 140 can be used to receive a user's elbow when in use. Padding 141 can be located wholly or partially around an outside of the elbow member 140. In this manner, a user's elbow and portions of a user's arm can be cushioned during use. The bottom end of the longitudinal member 110 can be located adjacent to a first end of the curved elbow member 140. The longitudinal member 110 can be directly connected to the curved elbow member 140. The curved elbow member 140 can also be formed as an integral part of the longitudinal member 110 as a single unit. The dimensions and curvature of the elbow member can vary. The curved elbow member can be solid or hollow.

The shoulder stretching device 100 also includes the bottom transverse member 150. The bottom transverse member 150 can extend from a second end of the curved elbow member 140. The bottom transverse member 150 can include a first curved portion 151, a first straight portion 152, a second curved portion 153, and a second straight portion 154. The first curved portion 151 can be located adjacent to and extend from the second end of the elbow member 140. The bottom transverse member can be directly connected to the curved elbow member or can be formed as an integral part of the longitudinal member and the curved elbow member as a single unit. It is to be understood that reference to a first end or second end is for illustrative, directional purposes only and does not require distinct, separate parts that are attached to one another as some of the components can be formed as a single unit.

The first curved portion 151 and the first straight portion 152 can form an angle $\theta_1$. The second straight portion 154 of the bottom transverse member 150 can be offset a desired distance from the bottom of the curve of the curved elbow member 140. The bottom transverse member can have a variety of lengths. The first straight portion 152, second curved portion 153, and second straight portion 154 can form an angle $\theta_2$. Angle $\theta_1$ and angle $\theta_2$ can be the same or different and can range from 95° to 150°. The angles $\theta_1$ and $\theta_2$ as well as the lengths of the first straight portion 152 and second straight portion 154 can be selected such that the bottom transverse member 150 can be positioned comfortably about a user's body during use. By way of example, the length of the first straight portion 152 or the second straight portion 154 can be selected based on the bodyweight of the user (e.g., longer lengths for users weighing more than 200 pounds compared to users weighing less than 200 pounds). The length of the first straight portion 152 and second straight portion 154 can range, for example, from 3 to 48 inches (7.6 to 121.9 cm). The lengths of the first straight portion 152 and second straight portion 154 can be the same or different. For example, the length of the second straight portion 154 can be less than the length of the first straight portion 152.

A handgrip 155 can be located at the terminal end of the second straight portion 154. The handgrip 155 can include a slip-resistant covering surrounding all or a portion of the handgrip 155. The slip-resistant covering for the handgrips 123/155 can be made from materials such as rubber, soft plastics, neoprene, urethanes, or foam materials [other materials?]. The thickness of the slip-resistant covering can range from 0.1 to 1.5 inches (0.3 to 3.8 cm) and can be selected to provide comfort to a user and proper use of the device. The handgrips can include etching, for example in the form of a pattern, in lieu of the slip-resistant covering to prevent a user's hand from slipping during use. The handgrip 155 can be interchangeable with other handgrips to provide additional functionality to the device. By way of example, a first handgrip can be removed from the second straight portion 154 and interchanged with a second handgrip. The second handgrip can have a length that is greater than the first handgrip for example. The second handgrip can also be angled in relation to the second straight portion 154 whereas the first handgrip may not be angled. The interchangeable handgrips 155 are another example of the versatility and multi-functionality of the device to provide a wide range of exercises for a wide range of targeted muscles.

The various components of the shoulder stretching device 100 can be made from rigid materials, including but not limited to polymeric plastics, thermoset plastics, metals, or metal alloys, fiberglass, or carbon fiber. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin. As used herein, the term "metal" and all grammatical variations thereof means any substance that comprises a metal, which includes pure metals and metal alloys.

Examples of plastics include but are not limited to low-density polyethylene (LDPE), high-density polyethylene (HDPE), polyethylene terephthalate (PET or PETE), polyvinyl chloride (PVC), polypropylene (PP), polystyrene (PS), high-impact polystyrene (HIPS), acrylonitrile butadiene styrene (ABS), cellulose-acetate-butyrate (Cab), polycarbonate (PC), or polyvinylidene fluoride or polyvinylidene difluoride (PVDF). Examples of metals include but are not limited to iron, aluminum, steel, carbon steel, stainless steel, zinc, lead, copper, tin, brass, nickel, and chromium. While all of the members of the shoulder stretching device 100 (i.e., the longitudinal member 110, top transverse member 120, forearm member 130, elbow member 140, and bottom transverse member 150) can be made from the same materials, it is also possible to have some of the members made from a different material than the other members. Moreover, one or more of the members can also include a reinforcing layer that is made from a material having a higher ductile or tensile strength compared to the material of the member. Preferably, a given member is made from the same material. For example, the first curved portion 151, first straight portion 152, second curved portion 153, and second straight portion 154 of the bottom transverse member 150 are preferably made from the same material. If different materials are used for different members, then the shoulder stretching device 100 can be manufactured such that the longitudinal member 110, elbow member 140, and bottom transverse member 150 are considered a single unit. The longitudinal, elbow, and bottom transverse members can also be manufactured such that the three members can be removably attached to each other.

The members of the shoulder stretching device 100 can all be cylindrical in shape having a circular cross-section or other geometric cross-sectional shapes, such as a triangle, square, or rectangle. The members can have the same or different diameters ranging from 0.25 to 4 inches (0.63 to 10 cm). As discussed above, the members can be solid or hollow. Additionally, a given member (e.g., the longitudinal member 110) can be hollow, while a different member (e.g., the bottom transverse member 150) can be solid. The diameter of the members can be selected based on whether the member is solid or hollow and to provide structural integrity to the device during use. By way of example, for solid members, the diameter may only need to be 0.25 inches to provide structural integrity; while for hollow members, the diameter may need to be 4 inches to provide structural integrity.

The shoulder stretching device 100 can be used to stretch and/or strengthen a variety of muscles in or around the shoulder region. Non-limiting examples of muscles that can be targeted using the shoulder stretching device and position of a user's arm include supraspinatus muscle—abducts (raises) shoulder to the side; infraspinatus muscle—external rotation of the shoulder; teres minor—external rotation of the shoulder; subscapularis muscle-internal rotation of the arm, assists with side abduction of the arm; and rear deltoid—external rotation and adduction of the upper arm. FIGS. 5-10B illustrate some of the different adjustments and positioning with respect to a user's body. Table 1 lists the different uses corresponding the FIGS. 5-10 B. As can be seen, one or more components of the shoulder stretching device and the position can be used to stretch different targeted muscles.

TABLE 1

| FIG. # | Type of Rotation | Arm | Relationship to body | Muscle group |
|---|---|---|---|---|
| 5 | External | Right | Front | Supraspinatus<br>Infraspinatus<br>Teres Minor |
| 6 | External | Right | Front | Supraspinatus<br>Infraspinatus<br>Teres Minor |
| 7 | External | Left | Front | Supraspinatus<br>Infraspinatus<br>Teres Minor |
| 8 | External | Left | Front | Supraspinatus<br>Infraspinatus<br>Teres Minor |
| 9A | Internal | Right | Side | Subscapularis<br>Teres Major<br>Pectoralis Major |
| 9B | Internal | Right | Back | Subscapularis<br>Teres Major<br>Pectoralis Maj |
| 10A | Internal | Left | Back | Subscapularis<br>Teres Major<br>Pectoralis Maj |
| 10B | Internal | Left | Side | Subscapularis<br>Teres Major<br>Pectoralis Maj |

A physical therapist, with or without the instruction from a doctor, can provide a user with specific exercises based on the targeted muscles, a specific injury, or a specific surgery that has been performed. The physical therapist can select the desired position of the top transverse member 120 and the forearm member 130 for each user and the specific exercises, for example, by utilizing the adjustment indicators 111/121/131. A user can perform the exercises at home with instructions from the physical therapist on how to perform the exercises with the proper location of the top transverse member and forearm member with their corresponding adjustment indicator number. It is important to note that all of these muscles also play a large part in overall shoulder stability. They are critical in holding the head of the humerus in the socket of the scapula. Accordingly, the shoulder stretching device allows a user to add leverage and specifically target these muscles to stretch them in a functional position. The various adjustable components of the shoulder stretching device allow for customization to ensure proper tension on targeted muscles.

An embodiment of the present disclosure is a shoulder stretching device comprising: a longitudinal member; a top transverse member operatively connected to a top end of the longitudinal member; a forearm member operatively connected to the longitudinal member; a curved elbow member connected to a bottom end of the longitudinal member; and a bottom transverse member indirectly connected to the longitudinal member via the curved elbow member, wherein at least a portion of the top transverse member, a portion of the forearm member, and a portion of the bottom transverse member are oriented perpendicularly to a longitudinal axis of the longitudinal member. Optionally, the top transverse member comprises a straight portion having a longitudinal axis that is oriented perpendicular to the longitudinal axis of the longitudinal member and a handgrip. Optionally, the top transverse member further comprises an angled portion, and wherein the handgrip is located at a terminal end of the angled portion. Optionally, a longitudinal axis of the angled portion forms an angle with the longitudinal axis of the straight portion in a range between 45° and 170°. Optionally, the top transverse member is adjustable in relation to the longitudinal member. Optionally, the device further comprises a top transverse member adjustment lock and a vertical adjustment lock that operatively connect the top transverse member to the top end of the longitudinal member. Optionally, the top transverse member adjustment lock is configured to allow the straight portion of the top transverse member to be slid through the top transverse member adjustment lock, and wherein a length extending from each side of the longitudinal axis of the longitudinal member is adjustable via the top transverse member adjustment lock. Optionally, the top transverse member adjustment lock is configured to allow the handgrip to be located closer to or further away from the longitudinal member. Optionally, the straight portion of the top transverse member comprises one or more adjustment indicators spaced a distance apart from each other. Optionally, the top transverse member adjustment lock is configured to allow the top transverse member to be rotated clockwise or counterclockwise perpendicularly to the longitudinal axis of the longitudinal member to position the handgrip on a left side or right side of the longitudinal member. Optionally, the vertical adjustment lock is configured to allow the top transverse member to move along the longitudinal member and closer to or further away from the top end; allow the top transverse member to rotate about the longitudinal axis of the longitudinal member; or both. Optionally, the longitudinal member comprises one or more one or more adjustment indicators spaced a distance apart from each other. Optionally, the forearm member is adjustably connected to the longitudinal member via a forearm adjustment lock, wherein the forearm adjustment lock is configured to allow the forearm member to move along the longitudinal member, rotationally around the longitudinal axis of the longitudinal member, or both. Optionally, all of or a portion of the forearm member is covered with padding located around an outside of the forearm member. Optionally, all of or a portion of the curved elbow member is covered with padding located around an outside of the curved elbow member. Optionally, the longitudinal member, the top transverse member, the curved elbow member, and the bottom transverse member have a cross-sectional shape selected from a circle, triangle, square, rectangle, or combinations of shapes. Optionally, the bottom transverse member comprises a first curved portion, a first straight portion, a second curved portion, and a second straight portion. Optionally, the first curved portion and the first straight portion form an angle $\theta_1$, wherein the first straight portion, the second curved portion, and the second straight portion form an angle $\theta_2$. Optionally, angle $\theta_1$ and angle $\theta_2$ are in a range from 95° to 150°, and wherein angle $\theta_1$ and angle $\theta_2$ are the same or different. Optionally, the device further comprises a handgrip located at a terminal end of the second straight portion.

Therefore, the apparatus, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While the apparatus, systems, and methods are described in terms of "comprising," "containing," or "including" various components or steps, the apparatus, systems, and methods also can "consist essentially of" or "consist of" the various components and steps. It should also be understood that, as used herein, "first," "second," and "third," are assigned arbitrarily and are merely intended to differentiate between two or more ends, portions, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A shoulder stretching device comprising:

- a longitudinal member;
- a top transverse member operatively connected to a top end of the longitudinal member;
- a forearm member operatively connected adjacent to a bottom end of the longitudinal member;
- a curved elbow member connected to the bottom end of the longitudinal member,
- wherein the curved elbow member is configured to receive a user's elbow; and
- a bottom transverse member indirectly connected to the longitudinal member via the curved elbow member,
- wherein at least a portion of the top transverse member, a portion of the forearm member, and a portion of the bottom transverse member are oriented perpendicularly to a longitudinal axis of the longitudinal member.

2. The shoulder stretching device according to claim 1, wherein the top transverse member comprises a straight portion having a longitudinal axis that is oriented perpendicular to the longitudinal axis of the longitudinal member and a handgrip.

3. The shoulder stretching device according to claim 2, wherein the top transverse member further comprises an angled portion, and wherein the handgrip is located at a terminal end of the angled portion.

4. The shoulder stretching device according to claim 3, wherein a longitudinal axis of the angled portion forms an angle with the longitudinal axis of the straight portion in a range between 45° and 170°.

5. The shoulder stretching device according to claim 1, wherein the top transverse member is adjustable in relation to the longitudinal member.

6. The shoulder stretching device according to claim 5, further comprising a top transverse member adjustment lock and a vertical adjustment lock that operatively connect the top transverse member to the top end of the longitudinal member.

7. The shoulder stretching device according to claim 6, wherein the top transverse member adjustment lock is configured to allow the straight portion of the top transverse member to be slid through the top transverse member adjustment lock, and wherein a length extending from each side of the longitudinal axis of the longitudinal member is adjustable via the top transverse member adjustment lock.

8. The shoulder stretching device according to claim 7, wherein the top transverse member adjustment lock is configured to allow the handgrip to be located closer to or further away from the longitudinal member.

9. The shoulder stretching device according to claim 8, wherein the straight portion of the top transverse member comprises one or more adjustment indicators spaced a distance apart from each other.

10. The shoulder stretching device according to claim 6, wherein the top transverse member adjustment lock is configured to allow the top transverse member to be rotated clockwise or counterclockwise perpendicularly to the longitudinal axis of the longitudinal member to position the handgrip on a left side or right side of the longitudinal member.

11. The shoulder stretching device according to claim 6, wherein the vertical adjustment lock is configured to allow the top transverse member to move along the longitudinal member and closer to or further away from the top end; allow the top transverse member to rotate about the longitudinal axis of the longitudinal member; or both.

12. The shoulder stretching device according to claim 11, wherein the longitudinal member comprises one or more one or more adjustment indicators spaced a distance apart from each other.

13. The shoulder stretching device according to claim 1, wherein the forearm member is adjustably connected to the longitudinal member via a forearm adjustment lock, wherein the forearm adjustment lock is configured to allow the forearm member to move along the longitudinal member, rotationally around the longitudinal axis of the longitudinal member, or both.

14. The shoulder stretching device according to claim 1, wherein all of or a portion of the forearm member is covered with padding located around an outside of the forearm member.

15. The shoulder stretching device according to claim 1, wherein all of or a portion of the curved elbow member is covered with padding located around an outside of the curved elbow member.

16. The shoulder stretching device according to claim 1, wherein the longitudinal member, the top transverse member, the curved elbow member, and the bottom transverse member have a cross-sectional shape selected from a circle, triangle, square, rectangle, or combinations of shapes.

17. The shoulder stretching device according to claim 1, wherein the bottom transverse member comprises a first curved portion, a first straight portion, a second curved portion, and a second straight portion.

18. The shoulder stretching device according to claim 17, wherein the first curved portion and the first straight portion form an angle $\theta_1$, wherein the first straight portion, the second curved portion, and the second straight portion form an angle $\theta_2$.

19. The shoulder stretching device according to claim 18, wherein angle $\theta_1$ and angle $\theta_2$ are in a range from 95° to 150°, and wherein angle $\theta_1$ and angle $\theta_2$ are the same or different.

20. The shoulder stretching device according to claim 17, further comprising a handgrip located at a terminal end of the second straight portion.

* * * * *